(12) United States Patent
Wilhelmsson et al.

(10) Patent No.: US 7,929,625 B2
(45) Date of Patent: Apr. 19, 2011

(54) QUALITY OF SERVICE BASED ANTENNA MAPPING FOR MULTIPLE-INPUT MULTIPLE-OUTPUT COMMUNICATION SYSTEMS

(75) Inventors: Leif Wilhelmsson, Dalby (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 772 days.

(21) Appl. No.: 11/858,706

(22) Filed: Sep. 20, 2007

(65) Prior Publication Data

US 2009/0080557 A1    Mar. 26, 2009

(51) Int. Cl.
*H04K 1/10* (2006.01)
(52) U.S. Cl. ........................................................ 375/260
(58) Field of Classification Search .................... 375/260
See application file for complete search history.

(56) References Cited

U.S. PATENT DOCUMENTS

| | | | |
|---|---|---|---|
| 5,389,965 A * | 2/1995 | Kuzma | 348/14.05 |
| 7,158,804 B2 | 1/2007 | Kumaran et al. | |
| 2001/0022785 A1 * | 9/2001 | Pessi | 370/352 |
| 2001/0052012 A1 * | 12/2001 | Rinne et al. | 709/224 |
| 2003/0076797 A1 | 4/2003 | Lozano | |
| 2003/0188249 A1 | 10/2003 | Park et al. | |
| 2005/0043031 A1 * | 2/2005 | Cho et al. | 455/450 |
| 2005/0192019 A1 * | 9/2005 | Kim et al. | 455/452.1 |
| 2005/0195889 A1 | 9/2005 | Grant et al. | |
| 2005/0250544 A1 | 11/2005 | Grant et al. | |
| 2006/0018347 A1 * | 1/2006 | Agrawal | 370/537 |
| 2006/0023624 A1 | 2/2006 | Han et al. | |
| 2006/0029124 A1 | 2/2006 | Grant et al. | |
| 2006/0056534 A1 | 3/2006 | Ionescu et al. | |
| 2006/0114858 A1 | 6/2006 | Walton et al. | |
| 2006/0121946 A1 | 6/2006 | Walton et al. | |
| 2006/0205357 A1 | 9/2006 | Kim | |
| 2006/0209764 A1 | 9/2006 | Kim et al. | |
| 2006/0234777 A1 | 10/2006 | Vannithamby et al. | |

(Continued)

FOREIGN PATENT DOCUMENTS

EP        1 508 992 A    2/2005

(Continued)

OTHER PUBLICATIONS

Schubert "User ordering and power allocation for optimal multiantenna precoding/decoding" smart antennas, 2004, ITG workshop Mar. 18-19, 2004, IEEE, Mar. 18, 2004, pp. 174-181.*

(Continued)

*Primary Examiner* — Juan A Torres
(74) *Attorney, Agent, or Firm* — Coats & Bennett, P.L.L.C.

(57) ABSTRACT

Methods and apparatus for use in a multiple-input multiple-output (MIMO) system transmitting a plurality of data substreams to a receiver employing ordered successive interference cancellation detection according to a predetermined sequence for decoding the data substreams. A quality of service (QoS) requirement is determined for each of two or more application-specific data streams, and the application-specific data streams are assigned to the data substreams according to the determined QoS requirements and the predetermined sequence, so that application-specific data streams having more stringent QoS requirements are decoded earlier than application-specific data streams having less stringent QoS requirements. In some embodiments, the determined QoS requirements comprise maximum delay requirements, and application-specific data streams requiring shorter maximum delays are assigned to earlier-decoded data substreams than application-specific data streams having less stringent maximum delay requirements. In other embodiments, the determined QoS requirements comprise an application-specific robustness.

25 Claims, 4 Drawing Sheets

U.S. PATENT DOCUMENTS

| | | | |
|---|---|---|---|
| 2006/0250941 A1 | 11/2006 | Onggosanusi et al. | |
| 2007/0183515 A1* | 8/2007 | Lim et al. | 375/260 |
| 2008/0013638 A1* | 1/2008 | Walton et al. | 375/260 |
| 2008/0049820 A1* | 2/2008 | Jia et al. | 375/227 |

FOREIGN PATENT DOCUMENTS

| | | |
|---|---|---|
| EP | 1564906 | 8/2005 |
| WO | 2006022876 A | 3/2006 |
| WO | 2006/043245 | 4/2006 |
| WO | 2006/062356 | 6/2006 |

OTHER PUBLICATIONS

Boche "Queueing theoretic optimal scheduling for multiple input multiple output multiple access channel" signal processing and information technology, 2003, ISSPIT 2003 proceedings of the 3rd IEEE international symposium on Dec. 14-17, 2003, IEEE, Dec. 14, 2003, pp. 576-579.*

Boche "Channel aware scheduling for multiple antenna multiple access channels" conference record of the 37th Asilomar conference on signals, systems, & computers Pacific groove, ca, Nov. 9-12, 2003, Asilomar conference on signals, systems and computers, IEEE, vol. vol. i of 2. conf. 37, Nov. 9, 2003, pp. 992-996.*

Ajib, "An overview of scheduling algorithms in MIMO-based fourth-generation wireless systems" Network, IEEE vol. 19, Issue: 5 Publication Year: 2005, pp. 43-48.*

Kim, "Effective Scheduling Schemes for Wireless Multiuser MIMO Systems with SIC Receivers", Joint Conference of Communications and Information (JCCI), 2004.*

Thomas, "A method for improving the performance of successive cancellation in mobile spread MIMO OFDM" Vehicular Technology Conference, 2002, Proceedings. VTC 2002-Fall, 2002 IEEE 56th vol. 1, Publication Year: 2002, pp. 18-22 vol. 1.*

Thomas, "Modulation and coding rate selection to improve successive cancellation reception in OFDM and spread OFDM MIMO systems" IEEE International Conference on Communications, 2003 ICC '03 vol. 4 Publication Year: 2003, pp. 2842-2846 vol. 4.*

Konsgen "An Enhanced Cross-Layer Two-Stage Scheduler for Wireless LANs" IEEE 18th International Symposium on Personal, Indoor and Mobile Radio Communications, 2007 PIMRC 2007 Issue Date : Sep. 3-7, 2007 On pp. 1-5.*

Ajib, Wessam et al. "An Efficient QoS-based Scheduling Algorithm for MIMO Wireless Systems." IEEE 62nd Vehicular Technology Conference (VTC2005-Fall). Sep. 25-28, 2005, vol. 3, pp. 1579-1583.

Choi, Young-June et al. "Downlink Scheduling with Fairness and Optimal Antenna Assignment for MIMO Cellular Systems." IEEE Global Telecommunications Conference (Globecom '04). Nov. 29-Dec. 3, 2004, vol. 5, pp. 3165-3169.

Choi, Young-June et al. "Optimal Antenna Assignment Considering QoS Under MIMO Environments." IEEE International Conference on Communications. Jun. 20-24, 2004, vol. 7, pp. 4216-4221.

Hartmann, Christian et al. "Urgency Based Scheduling for User-Individual QoS in Cellular MIMO-Systems." ITG Workshop on Smart Antennas. Mar. 18-19, 2004, pp. 257-260.

Kountouris, Marios et al. "QoS-based User Scheduling for Multiuser MIMO Systems." IEEE 61st Vehicular Technology Conference (VTC2005-Spring). May 31-Jun. 1, 2005, vol. 1, pp. 211-215.

Mun, Cheol. "Transmit-Antenna Selection for Spatial Multiplexing with Ordered Successive Interference Cancellation." IEEE Transactions on Commuications. Mar. 2006, vol. 54, Issue 3, pp. 423-429.

Tang, Jia et al. "Cross-Layer Design of Dynamic Resource Allocation with Diverse QoS Guarantees for MIMO-OFDM Wireless Networks." Sixth IEEE International Symposium on a World of Wireless Mobile and Multimedia Networks (WoWMoM 2005). vol. 1, pp. 205-212.

Wubben, D. et al. "Low Complexity Successive Interference Cancellation for Per-Antenna-Coded MIMO-OFDM Schemes by Applying Parallel-SQRD." IEEE 63rd Vehicular Technology Conference 2006 (VTC 2006-Spring), vol. 5, pp. 2183-2187.

Chung, S.T. et al. "Approaching Eigenmode BLAST Channel Capacity Using V-BLAST with Rate and Power Feedback." IEEE 54th Vehicular Technology Conference 2001 (VTC 2001-Fall), vol. 2, pp. 915-919.

Wolniansky, P.W. et al. "V-BLAST: An Architecture for Realizing Very High Data Rates Over the Rich-Scattering Wireless Channel." 1998 URSI Internatioinal Symposium on Signals, Systems, and Electronics, Sep. 29-Oct. 2, 1998, pp. 295-300.

Van Zelst, A. "Per-Antenna-Coded Schemes for MIMO OFDM." IEEE International Conference on Communications 2003 (ICC 2003, vol. 4, May 11-15, 2003, pp. 2832-2836.

Gorokhov, A. et al. "Receive Antenna Selection for MIMO Spatial Multiplexing: Theory and Algorithms." IEEE Transactions on Signal Processing, vol. 51, No. 11, Nov. 2003, pp. 2796-2807.

* cited by examiner

QUALITY OF SERVICE BASED ANTENNA MAPPING FOR MULTIPLE-INPUT MULTIPLE-OUTPUT COMMUNICATION SYSTEMS

BACKGROUND

1. Technical Field

The present invention generally relates to the field of communications, and more particularly relates to transmitting data in a multiple-input multiple-output (MIMO) communications system.

2. Background

In the continuing evolution of wireless communications standards, such as those promulgated by the $3^{rd}$ Generation Partnership Project (3GPP), increasing attention is focusing on multiple-input multiple-output (MIMO) systems. The use of multiple antennas at either or both of the transmitter and receiver in a wireless link enables several techniques for improving system capacity or reliability. Although much early work on MIMO technology emphasized space-time diversity techniques, more recent work has developed several approaches to spatial multiplexing in MIMO systems. With spatial multiplexing, data rates may be substantially increased, under certain conditions, by transmitting several data substreams in the same physical area, using the same frequencies.

There are several different techniques for obtaining these increased data rates. Some approaches require that the transmitter possess knowledge of the radio channel conditions, so-called channel state information (CSI). With perfect channel knowledge at the transmitter, the data substreams to be transmitted can be pre-processed in such a way that the received substreams are orthogonal to one another, and thus may be separately demodulated.

In practice, obtaining highly detailed and accurate CSI at the transmitter is generally impractical for at least two reasons. First, if CSI knowledge at the transmitter is based on feedback from the receiver, then the CSI is necessarily associated with an inherent delay resulting from the time lag between the measuring of the channel conditions and the use of the CSI at the transmitter. Second, sending detailed CSI from the receiver to the transmitter consumes valuable bandwidth. The more precise (and timely) the CSI, the more bandwidth is consumed. Unless the channel is varying extremely slowly, this fact requires a system design tradeoff between the accuracy of the estimates and the bandwidth consumed in feeding back the CSI.

Alternative approaches for spatial multiplexing have been developed that do not rely on precise channel knowledge at the transmitter side. Indeed, some of these techniques require no CSI at all. However, these techniques typically require that the transmitted data be coded across different substreams. This generally implies that joint decoding at the receiver end is required, resulting in high complexity. These high-complexity receivers may be impractical or too expensive for mobile devices.

One promising approach for exploiting the capacity-increasing benefits of spatial multiplexing, but with more reasonable demands on receivers, involves the use of successive interference cancellation (SIC) techniques. In an SIC receiver, data substreams are successively demodulated and decoded. Once the first data substream is demodulated, its effect on the received signal is estimated and subtracted, thus improving the receiver's ability to demodulate the succeeding streams. This approach can, in principle, be combined with any desired modulation/demodulation techniques, as well as with various coding techniques.

Several MIMO systems employing open-loop spatial multiplexing (i.e., requiring no instantaneous CSI) and SIC detection have been demonstrated. Although achieving system capacities approaching the theoretical maximums requires the use of complex multi-dimensional coding, alternative approaches where each transmit antenna radiates an independently encoded data substream have also been demonstrated. These approaches require significantly less complexity at both the transmitter and receiver ends. One example of such a system is the so-called V-BLAST architecture developed at Bell Laboratories and described in Wolniansky et al., "V-Blast: An Architecture for Realizing Very High Data Rates over the Rich-Scattering Wireless Channel", in *Proc. URSI ISSSE*, September 1998, pp. 295-300, the contents of which are incorporated herein by reference. An improvement of the V-BLAST architecture, in which per-antenna rate control (PARC) and per-antenna power allocation are used to improve system capacity, is described in Chung et al., "Approaching Eigenmode BLAST Channel Capacity Using V-BLAST with Rate and Power Feedback," in *Proceedings of the Veh. Techn. Conf.*, October 2001, pp. 915-919, the contents of which are incorporated herein by reference. In each of these systems, SIC decoding is used to successively and separately decode data substreams transmitted from each of two or more transmit antennas. In systems employing PARC, feedback from the receiver to the transmitter may be limited to indicating the rates that should be used for the different data substreams.

In an SIC receiver, the receiver demodulates and decodes a first data substream, preferably the most reliable substream, treating the others as interference. The decoded data substream is regenerated (i.e. re-encoded and re-modulated), so that its contribution to the total received signal can be determined and subtracted from the received signal. If the substream is correctly demodulated and decoded, and if the receiver's estimate of the channel is accurate enough, then the first substream's interference to the other substreams can effectively be eliminated from the received signal. The receiver then demodulates a second substream from the modified received signal. This procedure continues until each of the data substreams of interest have been demodulated.

Because data substreams are demodulated and decoded successively, SIC detection might result in considerable delays between the decoding of the first and last data substreams. In rough terms, in the case of N data substreams, the delay associated with decoding the last data substream is N times as large as for the first data substream. (In practice, the delay is somewhat worse, as all of the data substreams except for the last must also be regenerated to remove their impact from the received signal.) The absolute delay may be reduced by augmenting the decoding resources so that each decoding operation is performed more quickly, but this may be impractical or undesirable because of the concomitant increase in hardware complexity and/or power consumption.

Another concern that arises with SIC is that of robustness. In order to successfully decode a second or subsequent data substream, each of the preceding data substreams must generally have been decoded correctly. In systems employing energy-efficient rate scheduling, i.e., most systems seeking to maximize system throughput, a receiver has little margin for error. Thus, an error in decoding an earlier-decoded data substream may result in incomplete or incorrect cancellation of that data substream from the received signal. Subtracting an erroneously decoded stream may actually worsen the interference. For this reason, if cyclic redundancy check (CRC)

codes are available for each data stream, then cancellation is not attempted if the CRC does not properly compute. In any case, errors in decoding one substream will at best reduce the effectiveness of successive interference cancellation, and may often result in failed decoding of each of the subsequent data substreams.

SUMMARY

The teachings presented herein provide methods and apparatus for use in a multiple-input multiple-output (MIMO) system transmitting a plurality of data substreams to a receiver employing ordered successive interference cancellation detection according to a predetermined sequence for decoding the data substreams. In an exemplary method, a quality of service (QoS) requirement is determined for each of two or more application-specific data streams, and the application-specific data streams are assigned to the data substreams according to the determined QoS requirements and the predetermined sequence, so that application-specific data streams having more stringent QoS requirements are decoded earlier than application-specific data streams having less stringent QoS requirements.

In some embodiments, the determined QoS requirements comprise maximum delay requirements, and application-specific data streams requiring shorter maximum delays are assigned to earlier-decoded data substreams than application-specific data streams having less stringent maximum delay requirements. In some embodiments, the determined QoS requirements comprise an application-specific robustness, wherein application-specific data streams corresponding to less robust applications are assigned to earlier-decoded data substreams than application-specific data streams corresponding to more robust applications. In some of these embodiments, the application-specific data streams comprise a basic-quality data stream representing a basic-quality or low-resolution representation of an audio or video signal as well as an enhancement data stream, such that the basic-quality and enhancement data streams can be combined to obtain an enhanced-quality representation of the audio or video signal. In these embodiments, the basic-quality data stream is assigned to one or more earlier-decoded data substreams than the enhancement data stream.

In some embodiments of the invention, a coding rate corresponding to the first-decoded data substream is reduced, as compared to a maximum possible coding rate for the first-decoded data substream, to improve the likelihood that the most stringent QoS requirement is met. In other embodiments, more transmit power is allocated to the first-decoded data substream than is needed, to speed detection of the first-decoded data substream and to improve the likelihood that the most stringent QoS requirement is met.

In addition to various described methods, apparatus for carrying out these methods according to several embodiments of the invention are also described. Of course, the present invention is not limited to the specifically-described methods and apparatus, nor to the above features and advantages. Indeed, those skilled in the art will recognize additional features and advantages upon reading the following detailed description, and upon viewing the accompanying drawings.

DETAILED DESCRIPTION

Figure 1:
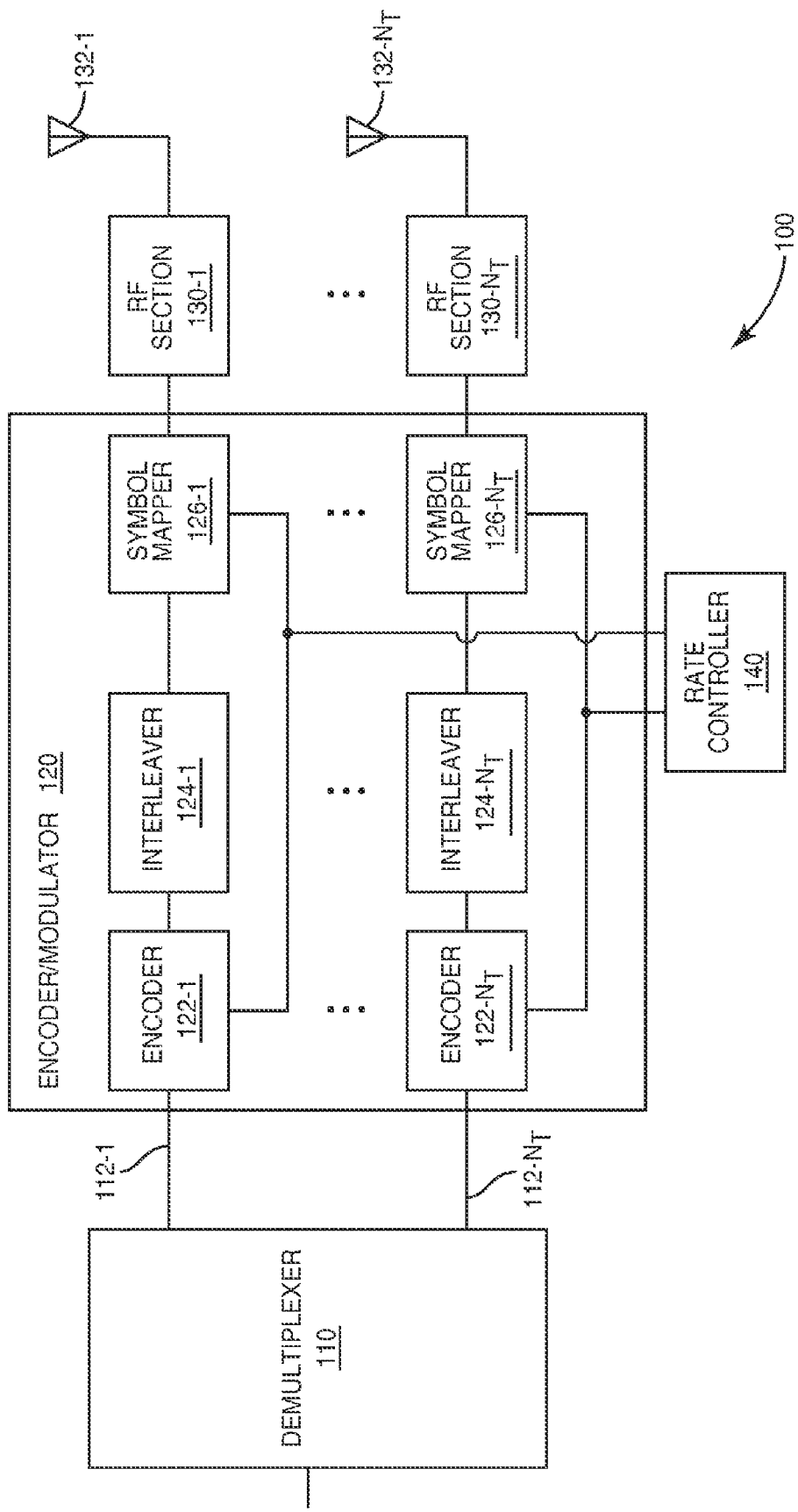
FIG. 1 is a block diagram of a MIMO transmitter system.

FIG. 1 illustrates a conventional multiple-output transmitter system 100 for use in a multiple-input multiple-output (MIMO) communications system. Multiple-output transmitters are well known to those skilled in the art, so the transmitter system 100 pictured in FIG. 1 will only briefly be described here. Transmitter system 100 includes a demultiplexer 110, encoder/modulator 120, RF sections 130-1 through 130-$N_T$, and transmit antennas 132-1 through 130-$N_T$. Encoder/modulator 120 includes $N_T$ independent encoding and modulation chains, each of which includes an encoder 122, interleaver 124, and symbol mapper 126.

Demultiplexer 110 divides an input data stream into data substreams 112-1 through 112-$N_T$, each of which is processed separately by one of the $N_T$ encoder/modulator chains. In each chain, encoder 122 applies channel coding according to conventional methods, so as to increase the redundancy of the data in the data substream. As is well known to those skilled in the art, this improves the ability of the receiver to recover the original data under poor signal conditions. After encoding, each data substream 112 is rearranged by interleavers 124, again according to conventional methods, to improve signal decoding in the presence of burst errors.

The bits of each encoded and interleaved data substream are then grouped and mapped to points in a signal constellation with symbol mappers 126-1 through 126-$N_T$. The constellation used depends on the supported modulation formats, which may include one or more phase-shift keying (PSK) formats or quadrature amplitude modulation (QAM) formats, and is selected by rate controller 140. Rate controller 140 also selects the channel coding used in encoders 122-1 through 122-$N_T$; the combination of channel coding and modulation format, including the modulation rate, establishes the data throughput, and effective coding rate, for each data substream transmitted at antennas 132-1 through 132-$N_T$. Each encoder/modulator chain's channel coding and modulation format may be configured independently, so that the throughput or coding rate for each data substream may vary.

RF sections 130-1 through 130-$N_T$ generate a carrier waveform using the symbols produced by symbol mappers 126, and transmit the carrier waveform using antennas 132-1 through 132-$N_T$. In many systems, transmit power is set equally for each RF section 130, but it need not be so.

Those skilled in the art will recognize that the block diagram of FIG. 1 is not limited to a particular modulation or multiple access scheme. Multiple-output transmitters for spatial multiplexing have been based, for example, on Wideband Code Division Multiple Access (W-CDMA) as well as Orthogonal Frequency Division Multiplexing (OFDM) technologies.

Figure 2:
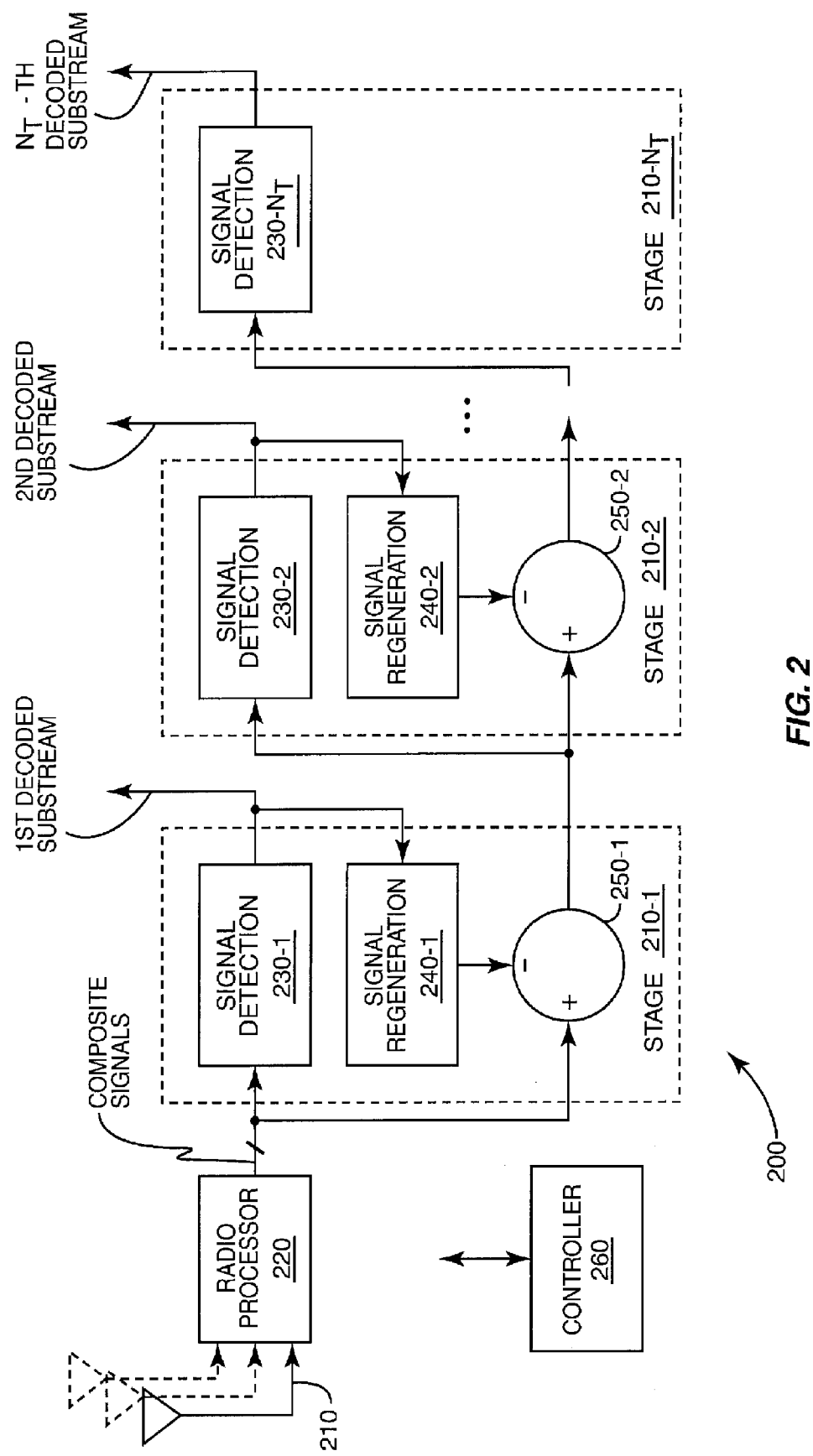
FIG. 2 is a block diagram of a successive interference cancellation receiver.

FIG. 2 illustrates functional blocks of a successive interference cancellation (SIC) receiver for use in a MIMO system. Receiver 200 comprises one or more receive antennas 210, a radio processor 220, and two or more signal detection stages 210. The number of stages 210 is selected to correspond to the number of transmitted data substreams; $N_T$ stages 210 are illustrated in FIG. 2. Each stage 210 (except for the last) comprises a signal detection circuit 230, a signal regeneration circuit 240, and a summing circuit 250. Controller 260 activates and controls the radio processor 220 and the stages 210-1 through 210-$N_T$.

In operation, the radio processor 220 is configured to provide digitized samples corresponding to a received composite signal that includes multiple ($N_T$) data substreams. Note that when multiple receive antennas are used, multiple composite signals, corresponding to each receiver branch, are processed at each stage. In the case of OFDM, for instance, multiple subcarrier signals, for each of the receiver branches, must be processed at each stage.

In any case, the successive signal detection stages 210 are configured to provide successive detection of the signals of interest within the received composite signal, and are further configured to provide successive cancellation of the detected signals such that later stages in the chain benefit from the detection and cancellation of signals in the prior stages. Thus, each detected substream is treated as "interference" with respect to the substreams remaining to be decoded, and is removed successively from the cascaded stage input signals by regenerating a signal corresponding to the decoded substream and removing the decoded substream's contribution to the composite signal by subtracting the regenerated signal from the cascaded stage input signals.

In the illustrated configuration, a first data substream is detected from the composite signal received from radio processor 220, using signal detection circuit 230-1. Signal detection circuit 230-1 includes demodulation, deinterleaving, and decoding circuitry that corresponds to the encoding and modulation circuits of transmitter 100. After detection, the first data substream is fed into signal regeneration circuit 240-1, which produces a signal corresponding to the contribution of the first data substream to the original composite signal. This regenerated signal is subtracted from the input composite signal with summing circuit 250-1. The "interference" corresponding to the first data substream is thus removed, or cancelled, from the original signal. Accordingly, the signal produced by summing circuit 250-1 will have a higher signal-to-interference ratio with respect to the second and subsequent data substreams.

The process is repeated, using the output from summing circuit 250-1, in stage 210-2. A second data substream is decoded with signal detection circuit 230-2, the "interference" signal corresponding to that substream is regenerated with signal regeneration circuit 240-2, and the regenerated signal is removed from the cascaded input signal with summer 250-2. This process is repeated until each of the $N_T$ data substreams is decoded. As shown in FIG. 2, no further cancellation is needed once the final data substream is decoded with signal detection circuit 230- $N_T$, so stage 210-$N_T$ does not include a regeneration circuit 240 or a summing circuit 250.

Although the combination of spatially multiplexed transmissions with SIC receivers provides very good performance in terms of system capacity and data rates, and requires receivers of only moderate complexity, the successive detection approach may result in significant delays before the last data substream is decoded. As noted above, these delays may be reduced by applying additional decoding resources (e.g. faster processors, increased parallelism, etc.), but additional decoding resources may be impractical.

However, problems caused by these delays may be mitigated by recognizing that data targeted to a particular receiver may include several application-specific data streams with different sensitivities to delay. For instance, real-time voice or video communications are typically sensitive to delays. An application such as a video call may therefore impose a delay constraint, such as 3 milliseconds (msec), for decoding the video call data once the signal is received. Because of the delay constraint, re-transmission of improperly decoded data may be impossible. On the other hand, a file download application, such as a retrieval of a web page, may have relaxed data constraints, but may impose other quality-of-service (QoS) constraints, such as a requirement that no data can be dropped. In this case, retransmissions may be required until the data is correctly decoded.

The processing delays necessitated by the use of SIC in the receiver, along with the QoS constraints corresponding to each of multiple application-specific data streams, may be accounted for when generating data substreams at the MIMO transmitter. For example, application data streams associated with very stringent requirements for delay may be mapped to data substreams that are demodulated early, while application data streams with relaxed delay requirements are mapped to data substreams that are intended to be demodulated last. QoS constraints other than delay requirements may also be accounted for in the mapping of data substreams and their transmission. For instance, if all application-specific data streams are associated with strict real-time requirements, then the data substream that is to be decoded first can intentionally be made more robust than is absolutely necessary for successful decoding. In this manner, the decoding of the first data substream can be made faster. For example, where iterative decoding is used, fewer iterations are necessary if extra power is allocated to the data substream, or if a lower coding rate is used. If the time required to detect the first data substream is reduced, then the delay for later data substreams is correspondingly reduced.

In yet another approach, application data corresponding to a single application may be divided into two or more application-specific data streams with different QoS requirements. These separate application-specific data streams, although corresponding to a single application, may then be separately mapped to transmitted data substreams in view of the differing QoS requirements and the anticipated order of detection at the receiver. For example, application data for a video call might include both audio and video data. Because users are typically more sensitive to drop-outs and/or delays in audio information than in video data, the audio data may be separated into an application-specific data stream that is mapped to one or more data substreams that will be detected earlier than the remaining video data. In more general terms, the more "mission-critical" data is separated from less critical data, and mapped to earlier-decoded data substreams. This mapping according to the order of anticipated decoding both reduces the delay before mission-critical data is decoded, and improves the likelihood of successful decoding of the mission-critical data relative to the less critical data, since the decoding of later data substreams is sensitive to the accumulation of error in the successive interference cancellation processes.

This separation of application data into more-or-less critical application-specific data streams may also be applied to data of a single type. For instance, video data might be separated into a low-resolution, or basic quality, part, and one or more enhancement parts. If the basic quality part is mapped to early-decoded data substreams, then a low-resolution image is more likely to be successfully decoded in the receiver. The enhancement part, which can be used to improve the resolution of the basic quality image, is less critical. If it is successfully decoded in time, then it is applied by the receiving unit to improve the image quality. If the enhancement data is overly delayed, or is not successfully decoded at all, a low-resolution image is still available.

Figure 3:
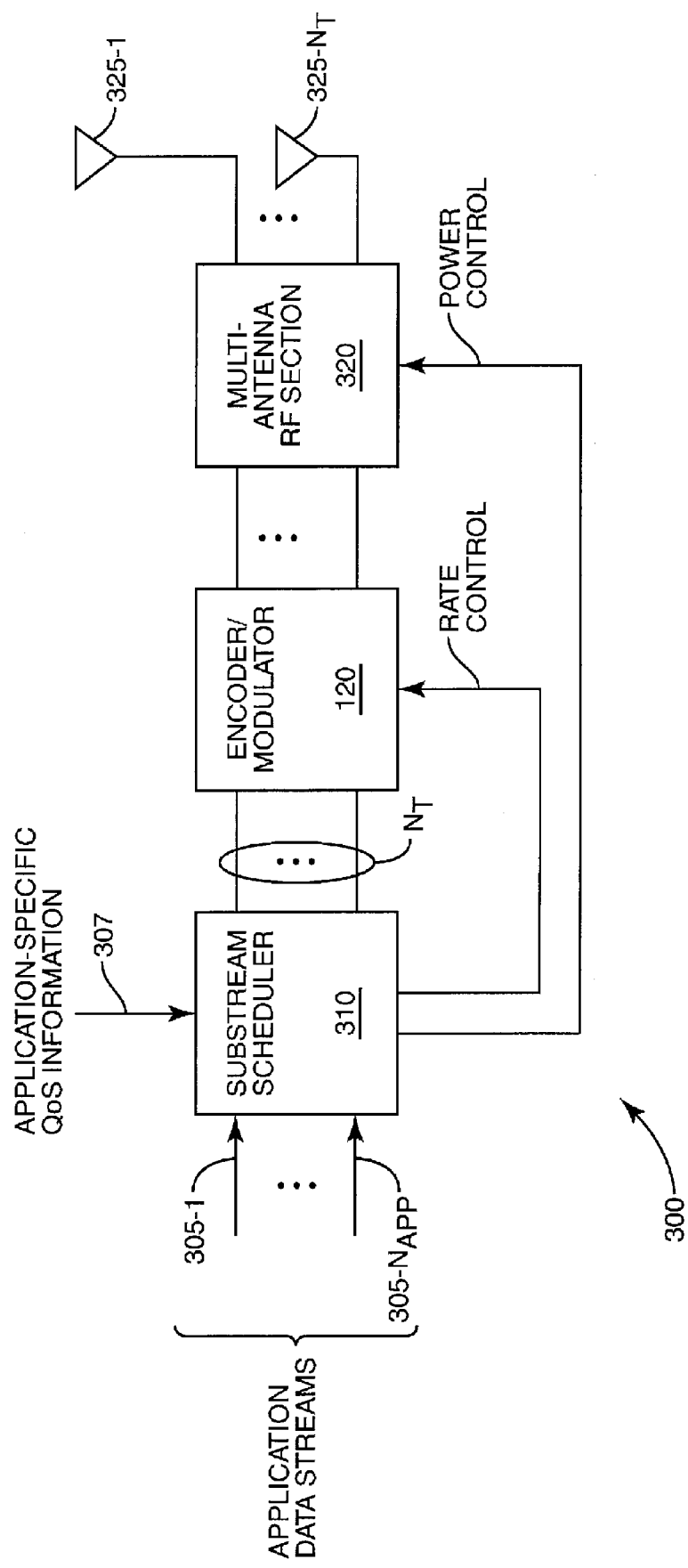
FIG. 3 is a block diagram of a MIMO transmitter system according to one or more embodiments of the invention.

Thus, FIG. 3 illustrates functional blocks of a multiple-output transmitter for transmitting multiple data substreams to a receiver employing ordered successive cancellation detection according to a predetermined sequence for decoding the data substreams. Transmitter 300 includes a substream scheduler 310, an encoder/modulator 120, and a multi-antenna RF section 320, providing radio frequency signals to each of two or more transmit antennas 325-1 through 325-$N_T$.

One or more application-specific data streams 305-1 through 305-$N_{APP}$ are provided to substream scheduler 310. Typically, application-specific data streams 305 are targeted to the same receiver 200, but the techniques described herein are more generally applicable, and may be applied where receivers are using SIC for multi-user detection (MUD) as well. Application-specific QoS information 307 is also provided to substream scheduler 310. Application-specific QoS information 307 may be provided separately, as shown in FIG. 3, or may be combined with or derived from the application-specific data streams 305. In some embodiments, application-specific QoS information will be explicitly defined, such as in terms of a maximum permissible delay. In others, specific QoS requirements must be derived from information identifying an application type, service type or class, or the like.

Substream scheduler 310 is configured to map the NAPP application-specific data streams 305 to $N_T$ (two or more) data substreams for transmission at antennas 325. This mapping is performed in view of an anticipated order for decoding the $N_T$ data substreams at the target receiver 200, as well as in view of the QoS information 307 corresponding to each application-specific data stream 305. In a typical embodiment, the detection order is agreed between transmitter 300 and receiver 200. However, "agreed" does not necessarily imply that the detection order is negotiated between transmitter 300 and receiver 200. For instance, receiver 200 may be directed to use a particular detection order via a control channel message, or receiver 200 may be pre-programmed to decode data substreams in a particular order.

Encoder/modulator 120 provides $N_T$ separate encoder/modulator channels for each of the $N_T$ data substreams, as was shown in FIG. 1, and is therefore not described in detail again here. However, in the embodiment illustrated in FIG. 3, rate control is applied to encoder/modulator 120 by substream scheduler 310. This rate control may independently adjust the modulation format and the coding scheme for each of the $N_T$ encoder/modulator channels. Similarly, multi-antenna RF section 320 comprises $N_T$ RF subsections, one for each encoder/modulator chain. Each of these subsections is similar to the RF sections 130 pictured in FIG. 1. However, the RF section 320 pictured in FIG. 3 is subject to power control from substream scheduler 310. Accordingly, RF section 320 comprises two or more subsections comprising conventional upconverter circuitry and carrier-wave generation circuitry; each subsection may be individually controlled with the power control signal from substream scheduler 310.

Figure 4:
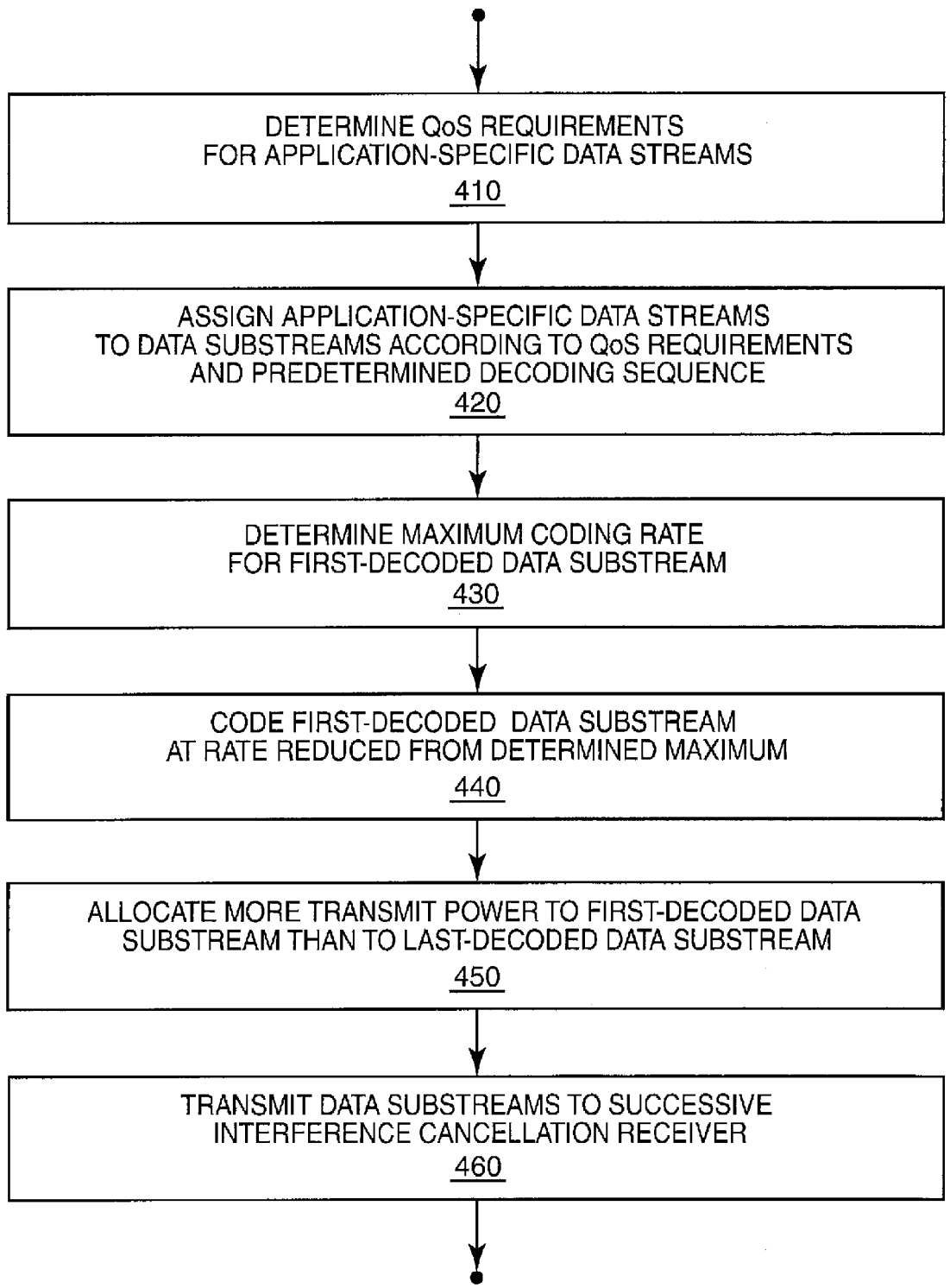
FIG. 4 is a flow diagram illustrating an exemplary method for use in a MIMO system transmitting data substreams to a SIC receiver.

An exemplary method that may be implemented using transmitter 300 is illustrated in FIG. 4. The method begins at block 410, with the determination of QoS requirements for two or more application-specific data streams. As discussed above, in some embodiments explicit QoS requirements may be received by substream scheduler 310 along with the application-specific data streams. In these embodiments, "determining" the QoS requirements thus simply means retrieving the received QoS requirements. In others, the QoS requirements are derived from the application-specific data streams themselves, or from service identifiers or application types associated with the application-specific data streams. In still other embodiments, application data from a single application may be divided into two or more application-specific data streams having different QoS requirements. For instance, as discussed above, video conference data may be split into an audio data stream, having high sensitivity to dropouts or delayed data, and a video data stream, with relatively less sensitivity to delayed data. Likewise, application data of a single type may be split into two or more application-specific data streams, and QoS requirements determined separately for each. For example, video data may be split into a low-resolution part, having stringent delay and/or error rate requirements, and an enhancement part, with relaxed QoS requirements.

At block 420, the application-specific data streams are mapped to data substreams according to the QoS requirements and an anticipated decoding order for the data substreams at the target receiver. An application-specific data stream with the most demanding delay requirement is mapped to one or more data substreams that will be decoded first, while application-specific data streams with less demanding requirements are mapped to later-decoded data substreams. Thus, SIC receiver 200 will decode the more critical application-specific data streams first, and the time-sensitive data will be available for use even as it is recoded and re-processed in the subsequent detection stages.

The effect of this mapping is most clearly demonstrated with a numerical example. Suppose that decoding a data substream takes 3 msec, and re-encoding takes 1 msec. The delay before detection of the first data substream is complete is then 3 msec, while the delay for the second data substream is 7 msec. If any of the application data is sensitive to delays longer than 3 msec, then it must be mapped to the first data substream, or SIC detection is not feasible. Instead, faster detection would be required, implying a more complex receiver design and/or increased power consumption. Otherwise, performance degradation would occur. Thus, by making use of the fact that different application-specific data streams might have different delay constraints, and by positioning the least delay-tolerant data stream first in the SIC detection sequence, performance is improved.

In order to further speed processing of the first data substream, the coding rate may be adjusted, as shown at blocks 430 and 440. At block 430, a nominal coding rate, corresponding to the maximum practical coding rate for the first data substream, given the channel conditions, is determined. This determination is done using conventional methods. The channel conditions may be known to the transmitter 300 from CSI feedback from receiver 200, or receiver 200 may directly signal transmitter 300 with a supportable rate for the substream. At block 440, the first-decoded data substream is encoded at a rate reduced from the determined maximum rate. By reducing the rate, additional margin in the decoding process is produced. Thus, iterative decoding may terminate (successfully) more quickly, speeding the overall decoding cycle. For instance, suppose again that a normal decode cycle for a data substream takes 3 msec. Suppose further that the demodulation takes 0.5 msec, and each of 5 iterative decoding cycles takes 0.5 msec, for a total of 3 msec. By intentionally reducing the coding rate of the first data substream, compared to a maximum coding rate determined from the channel conditions, the error performance in the iterative decoder might be such that only two iterations are needed. In this case, the total decode time is reduced from 3 msec to 1.5 msec. After 1.5 msec, the data from the first data substream is available to the appropriate application, and decoding of subsequent data substreams may begin. If the second data substream corresponds to application-specific data that also has tight delay requirements, then the coding rate for that data substream may also be reduced, to speed its decoding as well. Given the preceding decoding and regeneration time estimates, the data from the second data substream can be available in 3.5 msec.

Although the previous example was simplified, those skilled in the art will appreciate the flexibility provided by code rate adjustments coupled with proper mapping of application-specific data to data substreams. Those skilled in the art will also recognize that code rate reductions carry a penalty as well, as the data rate is correspondingly reduced. However, the reduced data rate can be factored in to the mapping process, and in many cases will have no adverse effects on the user application.

An additional adjustment, further enhancing scheduling flexibility, is available. Just as reducing the coding rate for the first data substream speeds detection, so will an increase in transmit power allocated to the first data substream, as shown in block 450. Based on channel conditions, a nominal transmit power level required for successful detection may be determined. Allocating additional transmit power compared to this nominal level, i.e., more transmit power than is needed for reliable detection, will reduce the detection time required for the first data substream. In order to keep the overall transmit power constant, this increased allocation of transmit power to the first data substream will of course mean that transmit powers for subsequent data substreams must be reduced. However, this re-allocation of power will speed detection of early data substreams, thus permitting more stringent delay requirements to be met. Those skilled in the art will appreciate that increasing the transmit power level for a data substream will improve the detection time in much the same way as reducing the coding rate. Accordingly, this transmit power adjustment at block 450 may be applied instead of the coding rate adjustment of block 440, to achieve similar results. Alternatively, the transmit power adjustment of block 450 may be applied in addition to a coding rate adjustment, in order to further speed detection of time-sensitive application data in the earliest-decoded data substreams.

The data substreams are finally transmitted at block 460. As discussed above, the mapping of application-specific data to data substreams is performed in view of an anticipated, or agreed, decoding order at the SIC receiver 200. Although the examples discussed above assume that a single data substream is mapped to a single physical antenna, those skilled in the art will appreciate that pre-coding techniques may be used, so that each data substream is actually transmitted using two or more physical antennas. In some scenarios, each data substream may be mapped to all of the available transmit antennas; the number of data substreams may be less than the number of physical antennas. Although this approach increases the complexity of both the transmitter and the SIC receiver, the techniques described herein may still be applied to improve application performance.

Those skilled in the art will also appreciate that several of the functional elements of transmitter 300 described above may be provided through the use of dedicated hardware, as well as hardware capable of executing software in association with appropriate software or firmware. In particular, those functional elements described as a "controller" or a "processor", as well as the substream scheduler 310 of FIG. 3, may be implemented by a single processor, by a shared processor, or by several individual processors, some of which may be shared. Furthermore, the term "processor" or "controller" does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included.

Finally, those skilled in the art will recognize that the foregoing description and the accompanying drawings represent non-limiting examples of the methods and apparatus taught herein for transmitting a plurality of data substreams to a SIC receiver in a MIMO system. Accordingly, the present invention is limited only by the following claims and their legal equivalents.

What is claimed is:

1. A method for use in a system for transmitting a plurality of spatially-multiplexed data substreams to a receiver configured to successively decode the data substreams in a pre-determined sequence, the method comprising:
determining, using a processor, a quality of service (QoS) requirement for each of two or more application-specific data streams;
assigning, using a processor, each of the application-specific data streams to one or more of the data substreams according to the determined QoS requirements and the pre-determined sequence for decoding the data substreams, so that application-specific data streams having more stringent QoS requirements are decoded earlier than application-specific data streams having less stringent QoS requirements.

2. The method of claim 1, wherein the determined QoS requirement comprises a maximum delay requirement and wherein application-specific data streams requiring shorter maximum delays are assigned to earlier-decoded data substreams than application-specific data streams having less stringent maximum delay requirements.

3. The method of claim 1, wherein the determined QoS requirement comprises an application-specific robustness, and wherein application-specific data streams corresponding to less robust applications are assigned to earlier-decoded data substreams than application-specific data streams corresponding to more robust applications.

4. The method of claim 3, wherein the application-specific data streams comprise a video data stream and a corresponding audio data stream, and wherein the audio data stream is assigned to earlier-decoded data substreams than the video data stream.

5. The method of claim 1, wherein the application-specific data streams comprise a basic-quality data stream corresponding to a basic-quality representation of an audio or video signal, and an enhancement data stream, such that the basic-quality and enhancement data streams can be combined to obtain an enhanced-quality representation of the audio or video signal; and wherein the basic-quality data stream is assigned to one or more earlier-decoded data substreams than the enhancement data stream.

6. The method of claim 1, further comprising reducing a coding rate corresponding to the first-decoded data substream compared to a maximum coding rate determined for the first-decoded data substream from channel conditions, to improve the likelihood that the most stringent QoS requirement is met.

7. The method of claim 1, further comprising allocating additional transmit power to the first-decoded data substream, compared to a required transmit power level determined from channel conditions, to reduce detection time for the first-decoded data substream and improve the likelihood that the most stringent QoS requirement is met.

8. The method of claim 1, further comprising transmitting each data substream by a separate antenna.

9. The method of claim 1, further comprising mapping each data substream to two or more transmit antennas using a pre-coding operation.

10. A substream scheduler circuit for use in system for transmitting a plurality of spatially-multiplexed data substreams to a receiver configured to successively decode the data substreams in a pre-determined sequence, said substream scheduler circuit comprising a processor configured to:
   determine a quality of service (QoS) requirement for each of two or more application-specific data streams; and
   assign each of the application-specific data streams to one or more of the data substreams according to the determined QoS requirements and the pre-determined sequence for decoding the data substreams, so that application-specific data streams having more stringent QoS requirements are decoded earlier than application-specific data streams having less stringent QoS requirements.

11. The substream scheduler circuit of claim 10, wherein the determined QoS requirement comprises a maximum delay requirement, and wherein the processor is further configured to assign application-specific data streams requiring shorter maximum delays to earlier-decoded data substreams than application-specific data streams having less stringent maximum delay requirements.

12. The substream scheduler circuit of claim 10, wherein the determined QoS requirement comprises an application-specific robustness, and wherein the processor is further configured to assign application-specific data streams corresponding to less robust applications to earlier-decoded data substreams than application-specific data streams corresponding to more robust applications.

13. The substream scheduler circuit of claim 12, wherein the application-specific data streams comprise a video data stream and a corresponding audio data stream, and wherein the processor is configured to assign the audio data stream to earlier-decoded data substreams than the video data stream.

14. The substream scheduler circuit of claim 10, wherein the application-specific data streams comprise a basic-quality data stream corresponding to a basic-quality representation of an audio or video signal, and an enhancement data stream, such that the basic-quality and enhancement data streams can be combined to obtain an enhanced-quality representation of the audio or video signal; and wherein the processor is configured to assign the basic-quality data stream to one or more earlier-decoded data substreams than the enhanced data stream.

15. The substream scheduler circuit of claim 10, wherein the processor is further configured to reduce a coding rate for the first-decoded data substream compared to a maximum coding rate determined for the first-decoded data substream from channel conditions, to reduce detection time for the first-decoded data substream and improve the likelihood that the most stringent QoS requirement is met.

16. The substream scheduler circuit of claim 10, wherein the processor is further configured to divide application data into at least two application-specific data streams having differing QoS requirements, for assignment to different data substreams according to the QoS requirements and the pre-determined sequence for decoding the data substreams.

17. The substream scheduler circuit of claim 10, wherein the processor is further configured to allocate additional transmit power to the first-decoded data substream, compared to a required transmit power level determined from channel conditions, to reduce detection time for the first-decoded substream and improve the likelihood that the most stringent QoS requirement is met.

18. A multiple-output transmitter system for transmitting a plurality of spatially-multiplexed data substreams to a receiver configured to successively decode the data substreams in a pre-determined sequence, the transmitter system comprising:
   a multiple-antenna radio frequency (RF) section configured to transmit a plurality of encoded data substreams using two or more transmit antennas;
   an encoder/modulator section configured to encode and interleave the data substreams and to supply the encoded data substreams to the RF section; and
   a substream scheduler circuit configured to:
      determine a quality of service (QoS) requirement for each of two or more application-specific data streams; and
      assign each of the application-specific data streams to one or more of the data substreams according to the determined QoS requirements and the predetermined sequence for decoding the data substreams, so that application-specific data streams having more stringent QoS requirements are decoded earlier than application-specific data streams having less stringent QoS requirements.

19. The multiple-output transmitter system of claim 18, wherein the determined QoS requirement comprises a maximum delay requirement, and wherein the substream scheduler circuit is further configured to assign application-specific data streams requiring shorter maximum delays to earlier-decoded data substreams than application-specific data streams having less stringent maximum delay requirements.

20. The multiple-output transmitter system of claim 18, wherein the determined QoS requirement comprises an application-specific robustness, and wherein the substream scheduler circuit is further configured to assign application-specific data streams corresponding to less robust applications to earlier-decoded data substreams than application-specific data streams corresponding to more robust applications.

21. The multiple-output transmitter system of claim 18, wherein the application-specific data streams comprise a basic-quality data stream corresponding to a basic-quality representation of an audio or video signal, and an enhancement data stream, such that the basic-quality and enhancement data streams can be combined to obtain an enhanced-quality representation of the audio or video signal; and wherein the substream scheduler circuit is configured to assign the basic-quality data stream to one or more earlier-decoded data substreams than the enhanced data stream.

22. The multiple-output transmitter system of claim 18, wherein the substream scheduler circuit is further configured to reduce a coding rate for the first-decoded data substream compared to a maximum coding rate for the first-decoded data substream, to improve the likelihood that the most stringent QoS requirement is met.

23. The multiple-output transmitter system of claim 18, wherein the substream scheduler circuit is further configured to allocate more transmit power to the first-decoded data substream than to the last-decoded data substream, to improve the likelihood that the most stringent QoS requirement is met.

24. The multiple-output transmitter system of claim 18, wherein the encoder/modulation section is configured to independently encode each data substream for mapping to a single transmit antenna.

25. The multiple-output transmitter system of claim 18, wherein the encoder/modulation section is configured to pre-code the data substreams for mapping each data substream to two or more transmit antennas.

* * * * *